United States Patent
Lowekamp (10) Patent No.: US 9,118,733 B2
(45) Date of Patent: Aug. 25, 2015

(54) MULTILEVEL ROUTING

(75) Inventor: Bruce Bernard Lowekamp, San Carlos, CA (US)

(73) Assignee: Skype, Dublin (IE)

( * ) Notice: Subject to any disclaimer, the term of this patent is extended or adjusted under 35 U.S.C. 154(b) by 634 days.

(21) Appl. No.: 12/785,067

(22) Filed: May 21, 2010

(65) Prior Publication Data

US 2011/0289221 A1 Nov. 24, 2011

(51) Int. Cl.
*G06F 15/173* (2006.01)
*H04L 29/14* (2006.01)
*H04L 29/08* (2006.01)
*H04L 29/06* (2006.01)

(52) U.S. Cl.
CPC ............ *H04L 69/40* (2013.01); *H04L 67/1074* (2013.01); *H04L 67/1089* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 2002/0013833 A1* | 1/2002 | Wyatt et al. | 709/220 |
| 2003/0123432 A1 | 7/2003 | Cheng et al. | |
| 2008/0288580 A1* | 11/2008 | Wang et al. | 709/203 |
| 2009/0037601 A1* | 2/2009 | Jain et al. | 709/242 |

FOREIGN PATENT DOCUMENTS

| | | |
|---|---|---|
| CN | 101681337 | 3/2010 |
| WO | WO-2011144711 | 11/2011 |

OTHER PUBLICATIONS

Notification of Transmittal of the International Search Report and the Written Opinion of the International Searching Authority, or the Declaration, PCT/EP2011/058198, date of mailing Sep. 5, 2011, 11 pp.

Le, L., et al., "Hierarchical and Breathing Peer-to-Peer SIP System", *Proceedings of the 2007 IEEE International Conference on Communications*, pp. 1887-1892 (Jun. 1, 2007).

"Foreign Office Action", CN Application No. 201180025240.1, Sep. 25, 2014, 14 pages.

"Foreign Office Action", EP Application No. 11723902.0, Apr. 15, 2014, 3 pages.

* cited by examiner

*Primary Examiner* — Scott B Christensen
(74) *Attorney, Agent, or Firm* — Jim Ross; Micky Minhas (57) ABSTRACT

A communication system comprising a plurality of nodes that are capable of establishing a communication connection between two or more clients, the plurality of nodes being arranged in a hierarchy in which a node comprised in one level of the hierarchy is more likely to be reachable by a client trying to establish a communication connection with another client than a node comprised in a lower level of the hierarchy, the communication system being arranged such that, when a client determines that a node is unreachable for establishing a communication connection between it and another client, that communication connection is instead established by a node comprised in a higher level of the hierarchy than the unreachable node.

29 Claims, 5 Drawing Sheets

MULTILEVEL ROUTING

TECHNICAL FIELD

The invention relates to a communication system comprising a plurality of nodes for establishing communication connections between client terminals.

BACKGROUND

Communication systems link together two communication devices so that the devices can send information to each other in a call or other communication event. Information may include voice, text, images or video.

One such communication system is a peer to peer communication system, in which a plurality of end users can be connected for communication purposes via a communications structure such as the internet. The communications structure is substantially decentralized with regard to communication route switching therein for connecting the end users, which means that the end users can often establish their own communication routes through the structure.

The communication structure of a peer to peer system may be formed by a large number of distributed nodes. The distributed nodes may not necessarily be owned or operated by the system provider. Instead, the nodes may be clients running software that programs them to behave as a node in the communication system. The communication structure can thus be created by essentially "borrowing" a small amount of computing resources from millions of devices. A user can then access the peer to peer system via any one of those devices. In such systems, it is no longer necessary for the user to access a centralized server in order to gain access to the system as a whole.

The signaling required to set up a communication between two client devices in a peer to peer system is typically routed via one or more nodes. These nodes may act as relays or proxies by forwarding requests from a client on towards their destinations. An example is shown in FIG. 1.

Figure 1:
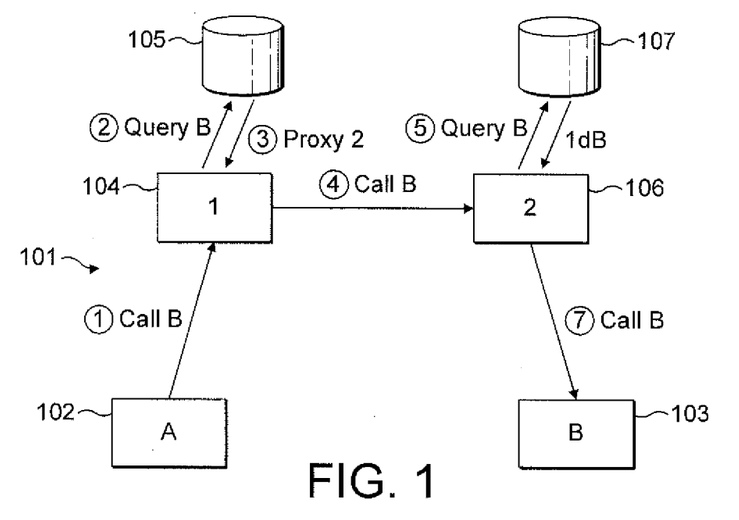
FIG. 1 shows a communication system comprising proxies for forwarding call requests.

FIG. 1 shows a communication system 101 comprising a first client A (102) that wants to communicate with a second client B (103). To establish the call, client A sends a call request to node 104 identifying client B. The identity might be, for example, a URI. Node 104 queries database 105 for the identity of the node 106 to which the call request should be routed. Database 105 may be a Domain Name Service (DNS). The database 105 returns location details for node 106. These details could include, for example, an IP address and port number for node 106. Node 104 uses the address details returned by the database look-up to forward the call request to node 106. Node 106 then looks-up the location of client B in another database 107, such as a location service. Finally, the call request is forwarded to client B.

The Session Initiation Protocol (SIP) is an example of a protocol that may be used to establish connections in a similar way to that shown in FIG. 1. SIP is a signaling protocol used to create, modify and terminate sessions between one or more participants. The sessions may include internet telephone calls, multimedia distribution and multimedia conferences. SIP uses proxies (a form of relay) to relay the signaling messages that are used to set-up the connection. The document "Session Initiation Protocol (SIP): Locating SIP Servers" (rfc 3263) describes how SIP proxies use DNS procedures to identify other proxies in the system. This includes one proxy for identifying a second proxy on the route towards a message's destination (see e.g. FIG. 1) and a back-up for the first proxy in case it fails after forwarding the request. This back-up proxy is located in the same level of the hierarchy as the first proxy.

SIP also allows clients to allocate multiple SIP proxies for redundancy. The multiple proxies may be defined by an outbound-proxy-set. The client attempts to maintain a direct flow with each of the proxies in the outbound proxy set so that it can detect when a flow fails. Since detecting a failure takes time there is a window in which incoming requests might be missed. By maintaining direct flows with multiple proxies, the client can protect against missed requests in the event of a flow failure (see "Managing Client-Initiated Connections in the Session Initiation Protocol (SIP) (rfc 5626)). Similarly to the back-up proxies described above, the proxies in the outbound proxy set are all located in the same level of the hierarchy.

Once a call is established, it may continue over a direct connection. An example is calls that involve the transfer of media data. Typically this requires each participant in the call to know the system location of all the other participants so that packets can be addressed appropriately. A call that proceeds over a direct connection may be set up via other nodes in the communication system (such as proxies 104 and 106 in FIG. 1, for example), but those nodes do not take an active part in the connection. Nodes whose active role is limited to performing an introductory service for the clients but which do not play an active role once the connection has been established are known as rendezvous nodes.

For some types of call, it is not possible to establish a direct connection between the participants An example is a call in which one or more of the participants is located behind a Network Address translator (NAT). The NAT is often implemented by a router that modifies system address information in packet headers for the purpose of remapping one address space into another. NATs may be used to implement firewalls, improve privacy and enable a plurality of devices to be connected to an external communication system via a single address. Some types of NATs prevent direct connections between clients located behind different NATs. For such calls the connection can only continue with the active participation of a relay node.

Protocols such as SIP that are based on offer/answer are difficult to operate through NATs. This is because such protocols often aim to establish a flow of media packets and thus carry the IP addresses and ports of media sources and sinks within their messages, which is problematic through NAT. Also, the protocols typically seek to create a media flow directly between participants, so that there is no application layer intermediary between them. This is difficult to accomplish through NAT.

SIP uses another protocol, known as the Interactivity Connectivity Establishment protocol (ICE), to negotiate the media relays that may be required to provide NAT traversal (see "Interactive Connectivity Establishment (ICE): A Protocol for Network Address Translator (NAT) Transversal for Offer/Answer Protocols" (draft-ietf-mmusic-ice) and "Traversal Using Relays Around NAT (TURN): Relay Extensions to Session Traversal Utilities for NAT (STUN)" (draft-ietf-behave-turn)). According to ICE, each end of the dialogue is responsible for locating a relay that is globally reachable and which is willing to relay traffic for it. The signaling is handled by proxies, in a similar way to that described above in FIG. 1.

Figure 2:
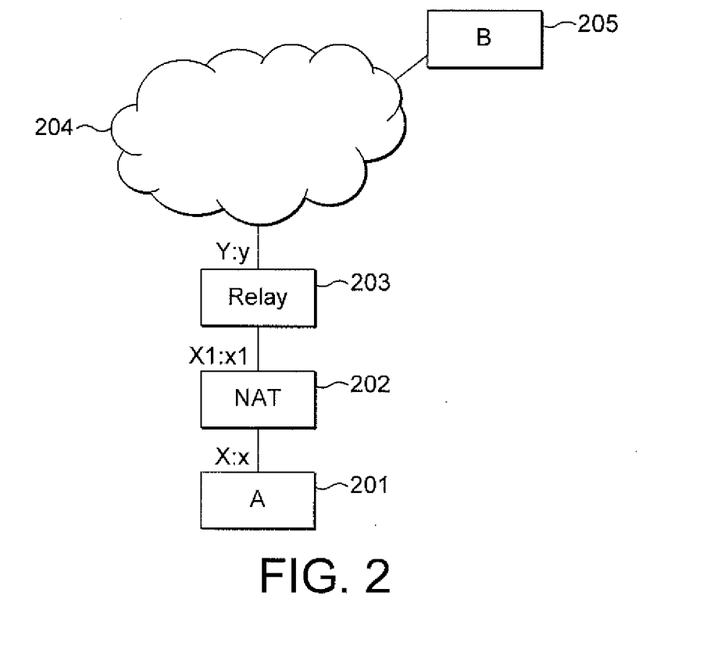
FIG. 2 shows a client terminal located behind a NAT.

An example of a client located behind a NAT is shown in FIG. 2. In FIG. 2, client A (201) wishes to contact client B (205) via a peer to peer communication system (204) such as the internet. Client A is located behind NAT 202. Client B may similarly be located behind a NAT and/or relay (not shown). In order for client A to set-up a connection with client B it must first establish a set of candidates. A candidate is a transport address that the client is entitled to use. One viable candidate is a transport address obtained directly from a local interface. The protocol also provides for clients to obtain additional candidates from one or more system nodes. A client wishing to establish a connection over an external communication system such as the internet should obtain a relayed candidate. Client A therefore sends an allocation request to relay 203. As client A is located behind a NAT, the NAT 202 first creates a binding mapping the address of the client X:x to an IP address and port on the public side of the NAT (X1':x1'). X1':x1' is known as the server reflexive candidate. There may be multiple NATs located between the client and the relay.

The allocate request is then received by the relay, which, if it is willing and able to accept the request, will allocate a port Y from its local IP address Y to client A. Y:y is known as the relayed candidate. The relay will return an allocate response to client A informing it of the relayed candidate and the server reflexive candidate. If there are multiple NATs located between the client and the relay, the allocate response will only include the server reflexive candidate corresponding to the outermost NAT, i.e. the NAT closest to the relay.

When the connection between client A and client B is established, the relay acts to forward packets between A and B. B sends traffic to the relay at Y:y, the relay forwards that traffic to X1':x1'. The forwarded traffic then passes through the NAT where it is mapped to X:x and delivered to A.

There are many different ways for a client to locate an appropriate relay for a connection across a peer to peer communication system. Relays may be used for many different functions, including NAT traversal, performance improvement through alternative route selection, transcoding etc. A specific relay may be chosen based on proximity to the client, performance etc. "Discovery of In-Band Streaming Services in Peer-to-Peer Overlays" by Buford et al describes allocating relays on the basis of a coordinate location system, load distribution and the capacity and availability of individual relays.

SUMMARY

All of the above systems assume that the selected relays are "perfect." They are considered to be globally reachable so that any client wishing to make contact is assumed to be able to reach them. In reality, however, locating "perfect" relays is fraught with problems because it is difficult for a node to determine that it is such an ideal reachable node. For a peer to peer communication system, connections are subject to failures when nodes are incorrectly identified as being globally reachable. Nodes provided by service providers are typically more reliable and can approach the ideal of a globally reachable node. However, it is expensive for the service provider to deploy many such nodes.

Therefore, there is a need for a communication system that enables a client terminal to contact a node even when the client terminal has found that node to be unreachable.

According to a first embodiment of the invention, there is provided a communication system comprising a plurality of nodes that are capable of establishing a communication connection between two or more clients, the plurality of nodes being arranged in a hierarchy in which a node comprised in one level of the hierarchy is more likely to be reachable by a client trying to establish a communication connection with another client than a node comprised in a lower level of the hierarchy, the communication system being arranged such that, when a client determines that a node is unreachable for establishing a communication connection between it and another client, that communication connection is instead established by a node comprised in a higher level of the hierarchy than the unreachable node.

The plurality of nodes may be arranged in a hierarchy in which a node comprised in one level of the hierarchy is responsible for one or more nodes comprised in a lower level of the hierarchy, the communication system being arranged such that the node that establishes the communication connection is a node that is responsible for the unreachable node.

The communication system may comprise a database arranged to store the identities of the plurality of nodes together with, for each node, the identity of one or more nodes comprised in a higher level of the hierarchy that are responsible for that node. Each node may be arranged to maintain a communication connection with the one or more nodes that are responsible for it in the higher level of the hierarchy.

The node comprised in the higher level of the hierarchy than the unreachable node may be arranged to establish the communication connection responsive to a request from the client. The node may be arranged to establish the communication connection by transmitting a request for a connection to the unreachable node, to a node that is responsible for the unreachable node or to the other client.

The plurality of nodes are arranged in a hierarchy in which the highest level of the hierarchy comprises nodes that are operated by a service provider. One or more of the plurality of nodes may be a user device arranged to operate as a node of the communication system, the plurality of nodes being arranged in a hierarchy in which the lowest level of the hierarchy comprises said user devices.

According to a second embodiment of the invention, there is provided a node capable of establishing a communication connection between two or more clients in a communication system comprising a plurality of nodes, the communication system being such that the nodes comprised within the system are arranged in a hierarchy in which a node comprised in one level of the hierarchy is more likely to be reachable by a client trying to establish a communication connection with another client than a node comprised in a lower level of the hierarchy, wherein the node is arranged to: assume responsibility for one or more nodes comprised in a lower level of the hierarchy than it; and when a client determines that a node for which it has assumed responsibility is unreachable, establish a communication connection between the client and another client on behalf of the unreachable node.

The node may be arranged to establish the communication connection responsive to a request from the client.

The node is arranged to, responsive to the request from the client, establish the communication connection by transmitting a request for a connection to the unreachable node, to a node that is responsible for the unreachable node or to the other client.

The node may be arranged to maintain a connection with each of the nodes in the lower level of the hierarchy for which it has assumed responsibility.

According to a third embodiment of the invention, there is provided a client for operating in a communication system comprising a plurality of nodes that are capable of establishing a communication connection between two clients, the plurality of nodes being arranged in a hierarchy in which a node comprised in one level of the hierarchy is more likely to be reachable by a client trying to establish a communication connection than a node comprised in a lower level of the hierarchy, the client being arranged to: determine that a node is unreachable for establishing a communication connection with another client; and responsive to that determination, transmit a request for a communication connection with the other client to a node comprised in a higher level of the hierarchy than the unreachable node.

The communication system may be arranged such that each client is allocated one or more nodes by means of which the client may establish communication connections with other clients, the client being arranged to transmit a request for a communication connection with another client to a node comprised in a higher level of the hierarchy responsive to a determination that one of its allocated nodes is unreachable.

The communication system may be arranged such that each client is allocated one or more nodes by means of which the client may establish communication connections with other clients, the client being arranged to transmit a request for a communication connection with another client to a node comprised in a higher level of the hierarchy responsive to a determination that one the nodes allocated to the other client is unreachable.

The client may be arranged to, on determining that a node is unreachable, transmit to one of its allocated nodes a request that the allocated node establish the communication connection with the other client.

The client may be arranged to determine that a node is unreachable if it does not receive a response from that node to a request for a communication connection with the other client.

The client may be arranged to determine, based on previous experience with the unreachable node, that the node is unreachable for establishing the communication connection.

The client may be arranged to determine, based on information previously received from the unreachable node, that the node is unreachable for establishing the communication connection.

The plurality of nodes may be arranged in a hierarchy in which each node comprised in an upper level of the hierarchy is responsible for one or more nodes in a lower level of the hierarchy, the client being arranged to, if it determines that a node is unreachable, transmit a request for a communication connection with the other client to a node in the upper level of the hierarchy that is responsible for the unreachable node.

The client may be arranged to determine the node in the upper level of the hierarchy that is responsible for the unreachable node from a database that stores identities of nodes in the lower level of the hierarchy and corresponding identities of nodes in the upper level of the hierarchy responsible for those nodes.

The client may be arranged to identify a candidate set of nodes by means of which a connection might be established with the other client.

The client may be arranged to apply a preference to each of the nodes comprised in the candidate set and to contact the nodes in accordance with those preferences.

According to a fourth embodiment of the invention, there is provided a computer-readable medium encoded with instructions that, when executed by a client operating in a communication system comprising a plurality of nodes that are capable of establishing a communication connection between two clients, the plurality of nodes being arranged in a hierarchy in which a node comprised in one level of the hierarchy is more likely to be reachable by a client trying to establish a communication connection with another client than a node comprised in a lower level of the hierarchy, cause the client to: determine that a node is unreachable for establishing a communication connection with another client; and responsive to that determination, transmit a request for a communication connection with the other client to a node comprised in a higher level of the hierarchy than the unreachable node.

According to a fifth embodiment of the invention, there is provided a computer-readable medium encoded with instructions that, when executed by a node capable of establishing a communication connection between two or more clients in a communication system comprising a plurality of nodes, the communication system being such that the nodes comprised within the system are arranged in a hierarchy in which a node comprised in one level of the hierarchy is more likely to be reachable by a client trying to establish a communication connection with another client than a node comprised in a lower level of the hierarchy, cause the node to: assume responsibility for one or more nodes that are comprised in a lower level of the hierarchy than it; and when a client determines that a node for which it has assumed responsibility is unreachable, establish a communication connection between the client and another client on behalf of the unreachable node.

BRIEF DESCRIPTION OF THE DRAWINGS

For a better understanding of the present invention, reference is made by way of example to the following drawings, in which.

DETAILED DESCRIPTION

A communication system may comprise a plurality of nodes that are capable of establishing a communication connection between two or more client terminals. These nodes may be arranged in a hierarchy comprising multiple levels in dependence with how reliably they can be reached by clients and other nodes within the system. A node comprised in one level of the hierarchy may be more likely to be reachable than a node comprised in a lower level of the hierarchy than that one level. Nodes comprised in an upper level of the hierarchy may also be responsible for one or more nodes comprised in a lower level of the hierarchy so that when a client cannot reach a lower-level node for a communication connection with another client terminal, that node's allocated upper-level node assumes responsibility for establishing the connection. In other words, each layer of the hierarchy may be responsible for the connectivity of the layer immediately beneath it.

A back-up node should be more likely to be reachable than a lower-level node it replaces. Thus, although a client terminal's first attempt to establish a connection may be unsuccessful, its second attempt via the back-up node will usually succeed. The highest level of nodes may be provided by the service-provider for guaranteed reachability. The system therefore allows the overlay of a peer to peer communication system to leverage imperfect nodes.

For example the least reliable nodes may be contained in the lowest level of the hierarchy while the most reliable nodes may be contained in the highest level. The least reliable nodes may be client terminals running software that programs them to act as nodes within the communication system. Such nodes may form what is known as the "overlay" of a peer to peer communication system. The nodes at higher levels of the hierarchy may be, for example, servers operated by the communication system provider.

The service provider may monitor nodes in the system and adjust the standing of individual nodes within the hierarchy in dependence on how reliable those nodes are proving to be. For example, clients that find a particular node to be unreachable may report back to a central node of the service provider that they are having difficulties contacting a particular node. Similarly, a node operated by a service provider or other nodes within the upper layers of the hierarchy may generate information for updating a node's standing within the hierarchy on receiving requests from clients to establish communication connections on behalf of nodes that have proved to be unreachable.

As an example, in a two-level hierarchy nodes forming the top level might be reachable over 90% of the time, and preferably over 99.9% of the time, while nodes forming the second level might be reachable over 60%, and preferably over 80% of the time. In reality, however, these percentages would be tuned based on a real-world distribution as the selection criteria applied to the hierarchy and the algorithms used by clients to identify a suitable route for establishing a connection are interdependent. In other words, if the criteria for organizing nodes into different levels of the hierarchy are altered the way in which a client decides to proceed after it determines that a node is unreachable may have to be changed as particular courses of action become either more or less desirable, based on the organization of the hierarchy.

Preferably all nodes maintain a connection to their parent nodes in the higher level. In the event that a client node cannot reach a node that it needs to make use of, it can contact that node's parent for connectivity. The parent node can then contact the unreachable node via the maintained connection. In some cases, the parent node may only be required to perform a rendezvous service by routing initial messages between the client terminal and the unreachable node and taking no active part in the connection once it has been established. In other cases, the parent node may remain in the signaling path and may be required to relay data (e.g. media) between the two or more client terminals in the connection.

Some of the nodes may be client terminals programmed to operate as nodes in the communication system. Such nodes may simultaneously act as both clients and nodes. In the same way that clients may be assigned one or more nodes in the communication system that they can use to establish connections with other clients, clients that are programmed to act as nodes may also be assigned to one or more other nodes in the system that they may use to establish connections.

The aim of this system is to ensure that a connection between two client terminals can be achieved even if one or more of the clients is unable to reach a node required to establish the connection. Pre-existing systems assume that all nodes are globally reachable. However, this is often not the case in reality. Embodiments of the present invention provide back-up nodes for establishing a connection in the event that the first choice of node cannot be reached by one or more of the participants.

A client may be arranged to identify a candidate list of nodes that might be used to establish the connection after one node proves to be unreachable. For example, if client A determines that it cannot directly establish a connection with client B, it may contact one of the relays allocated to client B requesting rendezvous or relay services. If that relay proves to be unreachable, client A may identify the other nodes it could ask to help establish the connection, including, for example, other relay nodes allocated to B in the same level of the hierarchy as the unreachable node, nodes allocated to A in the same level of the hierarchy as the unreachable node, and nodes in an upper level of the hierarchy that are responsible for the nodes in the lower level that are allocated to A and B. Client A may sort the available nodes (or the different routes to which they correspond) according to preference and try each in turn.

The number of potential routes via which the connection between clients A and B might be established can be high, particularly if there are multiple allocated nodes at each level for redundancy and more than two levels in the hierarchy. Therefore, client A may try only a subset of the possible candidates. Preferably the subset of available candidates always includes a path that should always work because it relies on connections between nodes in a lower level of the hierarchy and nodes in an upper level of the hierarchy that are permanently maintained. However, care should be taken not to overload nodes in the upper level of the hierarchy, and therefore clients are preferably arranged to try other options for establishing connections before involving upper-level nodes.

A communication system in which the nodes are arranged in a hierarchy preferably includes a database that stores the chain of responsibility linking the nodes of the system. A client that has determined that one or more nodes are unreachable may be arranged to access this database, or to request a node within the system to access the database on its behalf, so as to determine which nodes within the system have assumed responsibility for the unreachable node. The client may also use the database to determine other nodes within the system that are in the same level of the hierarchy as the unreachable node, such as additional nodes that are allocated to either the client or the client it is trying to contact for reasons of redundancy. The client may use the information obtained from the database to generate its list of candidate nodes.

The database containing the information about the allocation of nodes in the system may be stored within the communication system. For example, the database may be stored in a node that forms part of the overlay, the database may be distributed among nodes that form the overlay, or the database may be stored centrally, for example in a server operated by a system provider. Alternatively, the database may be stored by a node that is in all other respects not part of the communication system. If the database is stored by a node external to the communication system that node is preferably readily accessible by nodes and clients within the communication system.

A client terminal may determine that a node is "unreachable" if it does not receive a response to a request for a communication connection from a node. A client may determine that a node is unreachable if a time out expires before a response is received to a request sent to that node. A client may also determine that a node is unreachable if a request is bounced back to it as undeliverable. The determination could be based on information received from sources within the communication system, e.g. other clients, from internal information such as how reachable the client found a particular node or nodes based in a similar location (geographic or IP routing prefix) to be in the recent past, or based on information reported from the unreachable node based on that node's prior experience, location, or NAT/firewall configuration that it may have already determined to prevent connectivity.

The nodes arranged in the hierarchy may suitably be relay nodes, including proxy nodes, rendezvous nodes etc. The term "relay node" is used below to describe specific embodiments of the invention. However, it should be understood that this term is not intended to be limiting and that the scope of the invention extends to any node that is responsible for arranging connectivity between two or more clients.

Figure 3:
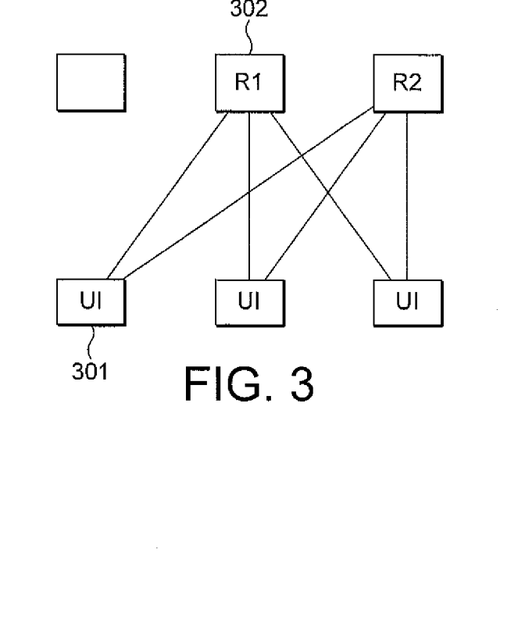
FIG. 3 shows a communication system in which a client terminal is allocated more than one node.
Figure 4:
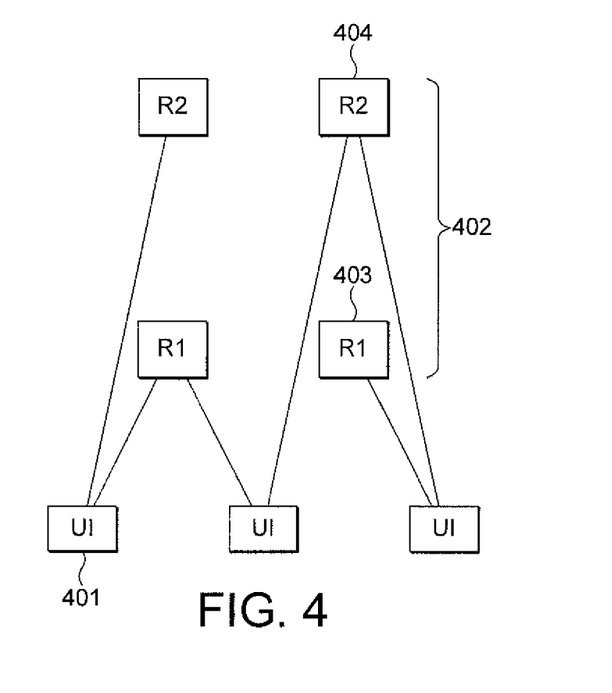
FIG. 4 shows a communication system in which the nodes are arranged in a two-level hierarchy and each level of the hierarchy is accessible by a client terminal.
Figure 5:
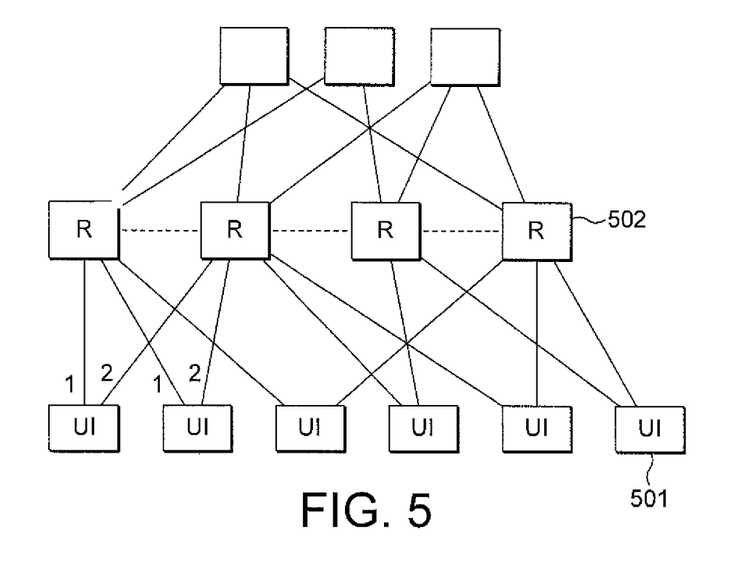
FIG. 5 shows a communication system in which the nodes are arranged in a two-level hierarchy and the upper level of the hierarchy is accessible by nodes in the lower level of the hierarchy.

Specific implementations of communication systems that provide rendezvous and relay services between nodes making use of an overlay system for connectivity are described below. The nodes providing the rendezvous and relay functionality are divided into a hierarchy comprising two or more levels. As shown in FIGS. 3 to 5, client nodes exist at the bottom. The next layer comprises rendezvous and relay nodes implemented by clients running software that enables them to act as system nodes as well as normal clients of the communication system. Relays deployed by the service provider are comprised in the highest level.

FIG. 3 shows a deployment in which there is a single group of relays, each of which is presumed to be globally reachable, i.e. every node in the communication system is assumed to be able to contact those nodes. The bottom row of boxes labeled "UI" are the clients (301). It would be expensive for a service provider to deploy all of the relays (so that all the relays would be globally reachable) and for a P2P communication system to provide the relays is subject to failures if nodes are incorrectly identified as being globally reachable. However, as FIG. 3 shows, each client may be allocated multiple relays (302). This redundancy is intended in case either relay fails or the client is behind a NAT that rebinds. This is similar to the redundancy provided by the sip-outbound mechanism (which is described in "Managing Client-Initiated Connections in the Session Initiation Protocol" (rfc 5626) referred to above).

FIG. 4 shows a communication system in which the relay nodes have been divided into a hierarchy comprising two levels (402). The clients (401) are able to contact relays in both levels of the hierarchy. The R1 relays (403) are intended to be contacted first. They may be pulled from a less reliable group, such as nodes in a peer-to-peer communication system. The R2 relays (404) are at a higher level and intended to be more reliable. A service provider may provide these relays. Suitably the R2 relays are only contacted after a connection attempt to an R1 relay fails. This means that the service provider can service many more clients with an R2 relay than with an R1 relay.

The communication system shown in FIG. 5 maintains the two-levels of relays but in this case the connectivity is arranged differently. Now each client (501) connects to two of the first tier of relays (502) for redundancy as described above. Another client wishing to connect will locate the relays responsible for the target client. This may involve locating one, two or more relays, depending on how many relays are responsible for the target client. The client will attempt to establish the connection through each of target relays in turn. The two clients may establish a direct connection (in which case the relay is used as a rendezvous service needed to establish the direct connection) or they may be unable (or not desire) to establish a direct connection, in which case the relay will relay future traffic on their behalf.

In FIG. 5 each relay in the lower tier has a connection established with at least one relay in the upper tier. If a client is unable to establish connectivity with either of the first tier relays allocated to the target client, it may locate the relays in the upper tier that are responsible for those lower-tier relays. It may then use the upper-tier relay to establish a connection to the lower-tier relay and then use that connection to establish a connection to the client. The upper-tier relay is preferably only needed to perform rendezvous services for the clients so that its active role ceases once the connection has been established. In some cases, the upper tier will actually be used only for rendezvous to the next lower tier (R) and the remainder of the connection rendezvous will proceed using a direct connection to R. However, it will sometimes be necessary for the upper-tier relay to provide relay services for the duration of the connection.

FIGS. 4 and 5 show communication systems in which the relay hierarchy is comprised of two layers. The model may be extended to include additional layers of relays. For example, a middle tier of client devices relays known to have particularly good reliability might be provided.

Figure 6:
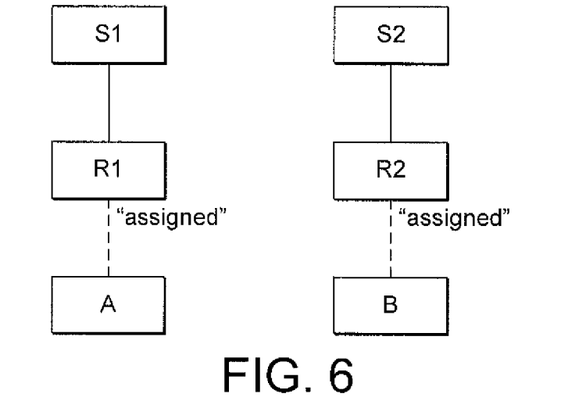
FIG. 6 shows a simplified version of a communication system in which the nodes are arranged in a two-level hierarchy.
Figure 7:
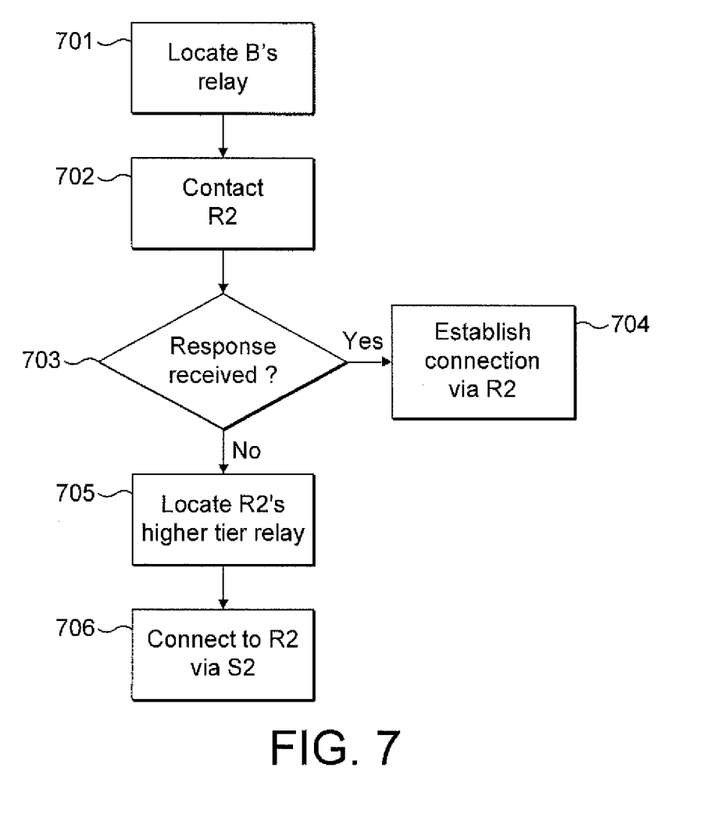
FIG. 7 shows a sequence of steps that may be followed to establish a connection via an unresponsive node.

FIG. 6 is an example of a communication system that is arranged in a similar way to the communication system of FIG. 5. For simplicity, FIG. 6 ignores the redundant same-level relays of FIG. 5. FIG. 7 is a flow-chart detailing the steps by which a connection from A to B via the communication system of FIG. 6 might be established. FIG. 7 and the associated description assumes symmetric relaying (i.e. the same relay handles both directions). However, the relaying need not be symmetric; different relays may be used to handle the different directions.

FIG. 6 shows two clients (A and B), two lower-level relays (R1 and R2), and two top-level provider-based relays, (S1 and S2). R1 and R2 are identified as relay candidates. R1 establishes a connection to S1 and R2 establishes a connection to S2. A database system intrinsic to the overlay registers S1 as the second-tier relay for R1 and S2 as the second-tier relay for R2. A joins the system and is assigned to R1 and B joins the system and is assigned to R2. These allocations are also stored in the database.

If A wishes to contact B and is unable to reach B directly, A will locate B's relay R2. It will exchange messages through R2 with B and use those to set up a direct A to B connection. In a less ideal situation, A may not be able to contact R2 directly but may be able to route the message via R1. This would lead to a connection from A to R1 to R2 to B for rendezvous. In another scenario, a direct connection between A and B may not be possible so that either R1 and/or R2 may need to remain on-path for relaying.

A communication connection may be established between client A and client B starting with A and any the hierarchy of nodes responsible for A in combination with any of the hierarchy of nodes responsible for B and terminating at B. In this example:

A to B
A to R2 to B
A to S2 to R2 to B
A to S2 to B
A to R1 to B
A to R1 to R2 to B
A to R1 to S2 to R2 to B
A to R1 to S2 to B
A to R1 to S1 to B
A to R1 to S1 to R2 to B
A to R1 to S1 to S2 to R2 to B
A to R1 to S1 to S2 to B
A to S1 to B

A to S1 to R2 to B
A to S1 to S2 to R2 to B
A to S1 to S2 to B

In practice, client A is unlikely to try all of these options. Instead, client A may only try a subset of all the available candidate paths, for example:
A to B
A to R1 to R2 to B
A to R1 to S1 to S2 to R2 to B This subset is not too onerous, since it comprises only three options. The final option is a path that should always exist, since R1 and S1, and R2 and S2 should maintain permanent connections between them. Including this path in the subset of candidates should therefore ensure that client A is eventually able to establish a communication connection with client B.

FIG. 7 shows a specific example in which client A, having failed to contact B directly, tries to contact B first via R2 and then via S2. This sequence of events is just one of many available options, as is apparent from the listing of all the available paths between clients A and B given above; however this example serves to illustrate the general processes involved as client A tries available nodes in turn.

In FIG. 7, A wants to contact B. In step 701, A locates B's relay by querying the database and in step 702, A contacts R2 requesting a connection with B. In step 703 A determines whether R2 is reachable, e.g. by determining whether it has received a response from R2. If a response was received, then A can proceed to establish a connection with B via R2 (step 704). If a response was not received, i.e. if R2 is determined to be unreachable, A will locate R2's higher-tier relay, S2 (step 705). A now contacts S2 requesting a connection with R2 via S2 (step 706). A trying to establish a connection with R2 through S2 is handled in the same manner as A trying to establish a connection with B through R2. Hopefully S2 only provides rendezvous, but it may need to provide relay to R2 and thus remain in the signaling path. Potentially, S2 may end up relaying media between A and B. However, the system will still try to negotiate the direct connection between A and B even if the signaling is relayed A to S2 to R2 to B.

Although FIG. 7 shows A contacting the higher-tier relay S2 to request a connection with R2, A might also contact R1 and ask it to contact S2 on its behalf. Similarly, A might transmit a request for a connection with B to the higher-tier relay, rather than requesting a connection to the lower-tier relay.

Both the clients and the nodes within the system may be implemented in hardware or software; although preferably they are implemented by means of software (e.g. program instructions running on a microprocessor). Examples of the functional blocks that might be implemented in a client and in a node of a communication system arranged as described herein are shown in FIGS. 8 and 9 respectively.

Figure 8:
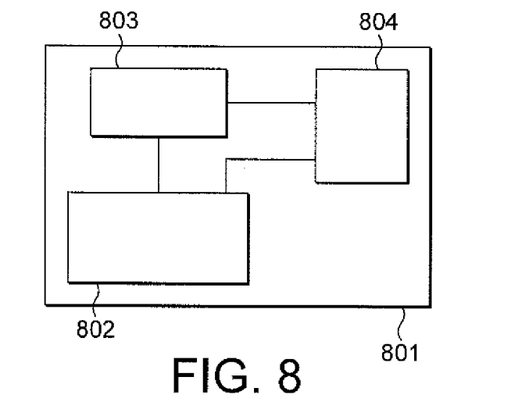
FIG. 8 shows an example of a client.

FIG. 8 shows a client 801 comprising a communication unit 802 for transmitting and receiving messages via the communication system. The communication unit is coupled to a determination unit 803 for determining that a node is unreachable, e.g. because a timeout has expired without receiving a response from the node. The client also comprises an identification unit 804, coupled to both the communication unit and the determination unit, for identifying higher-tier nodes that are responsible for unreachable nodes. The identification unit may be arranged to identify such nodes by causing the communication unit to transmit a request to a communication system database that stores such information. The request might be transmitted directly or via a node, e.g. via a lower-tier node allocated to the client.

Figure 9:
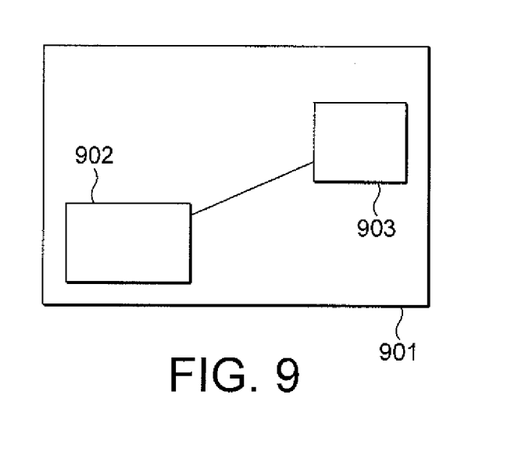
FIG. 9 shows an example of a node.

FIG. 9 shows a node 901 also comprising a communication unit 902 for transmitting and receiving messages via the communication system. The node may maintain connections with the lower-tier nodes for which it is responsible via the communication unit. The node also comprises an establishment unit 903 for receiving and processing requests from clients that have been unable to reach nodes for which the node is responsible. The establishment unit may establish connections between client terminals and unreachable nodes by means of the communication unit.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

What is claimed is:

1. A communication system comprising a plurality of nodes, each node including at least a processor, the plurality of nodes, including at least a central node, being configured to establish a communication connection between two or more clients, the plurality of nodes being arranged in a hierarchy in which a node comprised in one level of the hierarchy is more likely to be reachable by a client trying to establish a communication connection with another client than a node comprised in a lower level of the hierarchy, wherein the hierarchy is included as being part of the communication system, the communication system being arranged such that, when a client determines that a node is unreachable for establishing a communication connection between the client and another client, that communication connection is instead established by a node comprised in a higher level of the hierarchy than the unreachable node, wherein likelihood of reachability is tuned by the central node in the hierarchy responsive to the node in the higher level of the hierarchy receiving a request from the client to establish the communication connection for the unreachable node, based on client reports associated with attempting to contact the unreachable node, the client reports being received from respective clients by the central node for tuning, wherein the tuning is based, at least in part, on a suitable route identified by client-side algorithms, the tuning including generating information that includes instructions for updating the unreachable node's standing within the hierarchy, the tuning generated by the central node and executed by the unreachable node resulting in the node being rearranged in a different level of the hierarchy.

2. The communication system as claimed in claim 1, wherein the plurality of nodes are arranged in the hierarchy in which a node comprised in one level of the hierarchy is responsible for one or more nodes comprised in a lower level of the hierarchy, the communication system being arranged such that the node that establishes the communication connection is a node that is responsible for the unreachable node.

3. The communication system as claimed in claim 2, wherein the communication system comprises a database arranged to store the identities of the plurality of nodes together with, for each node, the identity of one or more nodes comprised in a higher level of the hierarchy that are responsible for that node.

4. The communication system as claimed in claim 2, wherein each node is arranged to maintain a communication connection with the one or more nodes that are responsible for it in the higher level of the hierarchy.

5. The communication system as claimed in claim 1, wherein the node comprised in the higher level of the hierarchy than the unreachable node is arranged to establish the communication connection responsive to the request from the client.

6. The communication system as claimed in claim 5, wherein the node comprised in the higher level of the hierarchy than the unreachable node is arranged to, responsive to the request from the client, establish the communication connection by transmitting a request for a connection to the unreachable node.

7. The communication system as claimed in claim 5, wherein the node comprised in the higher level of the hierarchy than the unreachable node is arranged to, responsive to the request from the client, establish the communication connection by transmitting a request for a connection to a node that is responsible for the unreachable node.

8. The communication system as claimed in claim 5, wherein the node comprised in the higher level of the hierarchy than the unreachable node is arranged to, responsive to the request from the client, establish the communication connection by transmitting a request for a connection to the other client.

9. The communication system as claimed in claim 1, wherein the plurality of nodes are arranged in the hierarchy in which the highest level of the hierarchy comprises nodes that are operated by a service provider.

10. The communication system as claimed in claim 1, wherein one or more of the plurality of nodes is a user device arranged to operate as a node of the communication system, the plurality of nodes being arranged in the hierarchy in which the lowest level of the hierarchy comprises said user devices.

11. A node, comprising at least a processor, configured to establish a communication connection between two or more clients in a communication system comprising a plurality of nodes, the communication system being such that the nodes comprised within the system are arranged in a hierarchy in which a node comprised in one level of the hierarchy is more likely to be reachable by a client trying to establish a communication connection with another client than a node comprised in a lower level of the hierarchy, wherein the node is configured to:

assume responsibility for one or more nodes comprised in a lower level of the hierarchy than it; and establish a communication connection between the client and another client on behalf of an unreachable node when the client determines that a node for which it has assumed responsibility is unreachable, wherein likelihood of reachability is tuned, by a central node in the hierarchy responsive to the node receiving a request from the client to establish the communication connection for the unreachable node, and established for at least some nodes in the communication system, based on client reports associated with attempting to contact the unreachable node, the client reports being received from respective clients by the central node for tuning, wherein the tuning is based, at least in part, on a suitable route identified by client-side algorithms, the tuning including generating information that includes instructions for updating the unreachable node's standing within the hierarchy, the tuning resulting in the unreachable node being rearranged in a different level of the hierarchy.

12. The node as claimed in claim 11, wherein the node is arranged to establish the communication connection responsive to the request from the client.

13. The node as claimed in claim 12, wherein the node is arranged to, responsive to the request from the client, establish the communication connection by transmitting a request for a connection to the unreachable node.

14. The node as claimed in claim 12, wherein the node is arranged to, responsive to the request from the client, establish the communication connection by transmitting a request for a connection to a node that is responsible for the unreachable node.

15. The node as claimed in claim 12, wherein the node is arranged to, responsive to the request from the client, establish the communication connection by transmitting a request for a connection to the other client.

16. The node is claimed in claim 11, wherein the node is arranged to maintain a connection with each of the nodes in the lower level of the hierarchy for which it has assumed responsibility.

17. A client, comprising at least a processor, for operating in a communication system comprising a plurality of nodes that are configured to establish a communication connection between two clients, the plurality of nodes being arranged in a hierarchy in which a node comprised in one level of the hierarchy is more likely to be reachable by a client trying to establish a communication connection than a node comprised in a lower level of the hierarchy, the client is configured to:

determine that a node is unreachable for establishing a communication connection with another client;

transmit, responsive to the determination of the node being unreachable, a request for a communication connection with the other client to another node comprised in a higher level of the hierarchy than the unreachable node;

generate a client report based, at least in part, on client-side algorithms that identifies a suitable route associated with attempting to contact the unreachable node; and transmit the client report to a central node in the hierarchy, wherein likelihood of reachability is tuned by the central node and established for at least some nodes in the communication system, based on client reports being generated by respective clients and sent to the central node.

18. The client as claimed in claim 17, wherein the communication system is arranged such that each client is allocated one or more nodes by means of which the client may establish communication connections with other clients, the client being arranged to transmit a request for a communication connection with another client to a node comprised in a higher level of the hierarchy responsive to a determination that one of its allocated nodes is unreachable.

19. The client as claimed in claim 17, wherein the communication system is arranged such that each client is allocated one or more nodes by means of which the client may establish communication connections with other clients, the client being arranged to transmit a request for a communication connection with another client to a node comprised in a higher level of the hierarchy responsive to a determination that one the nodes allocated to the other client is unreachable.

20. The client as claimed in claim 18, wherein the client is arranged to, on determining that one of the allocated nodes is unreachable, transmit to another one of its allocated nodes a request that the other allocated node establish the communication connection with the other client.

21. The client as claimed in claim 17, wherein the client is arranged to determine that the node is unreachable if it does not receive a response from that node to a request for a communication connection with the other client.

22. The client as claimed in claim 17, wherein the client is arranged to determine, based on previous experience with the unreachable node, that the node is unreachable for establishing the communication connection.

23. The client as claimed in claim 17, wherein the client is arranged to determine, based on information previously received from the unreachable node, that the node is unreachable for establishing the communication connection.

24. The client as claimed in claim 17, wherein the plurality of nodes are arranged in the hierarchy in which each node comprised in an upper level of the hierarchy is responsible for one or more nodes in a lower level of the hierarchy, the client being arranged to, if it determines that a node is unreachable, transmit a request for a communication connection with the other client to a node in the upper level of the hierarchy that is responsible for the unreachable node.

25. The client as claimed in claim 24, wherein the client is arranged to determine the node in the upper level of the hierarchy that is responsible for the unreachable node from a database that stores identities of nodes in the lower level of the hierarchy and corresponding identities of nodes in the upper level of the hierarchy responsible for those nodes.

26. The client as claimed in claim 17, wherein the client is arranged to identify a candidate set of nodes by means of which a connection might be established with the other client.

27. The client as claimed in claim 26, wherein the client is arranged to apply a preference to each of the nodes comprised in the candidate set and to contact the nodes in accordance with those preferences.

28. A computer-readable hardware medium encoded with instructions that, when executed by a client operating in a communication system comprising a plurality of nodes that are capable of establishing a communication connection between two clients, the plurality of nodes being arranged in a hierarchy in which a node comprised in one level of the hierarchy is more likely to be reachable by the client trying to establish a communication connection with another client than a node comprised in a lower level of the hierarchy, cause the client to:
  determine that a node is unreachable for establishing a communication connection with another client;
  transmit, responsive to the determination of the node being unreachable, a request for a communication connection with the other client to another node comprised in a higher level of the hierarchy than the unreachable node;
  generate a client report based, at least in part, on client-side algorithms that identifies a suitable route associated with attempting to contact the unreachable node; and
  transmit the client report to a central node in the hierarchy,
  wherein likelihood of reachability is tuned by the central node and established for at least some nodes in the communication system, based on client reports being generated by respective clients and sent to the central node.

29. A computer-readable hardware medium encoded with instructions that, when executed by a node capable of establishing a communication connection between two or more clients in a communication system comprising a plurality of nodes, the communication system being such that the nodes comprised within the system are arranged in a hierarchy in which a node comprised in one level of the hierarchy is more likely to be reachable by a client trying to establish a communication connection with another client than a node comprised in a lower level of the hierarchy, cause the node to:
  assume responsibility for one or more nodes that are comprised in a lower level of the hierarchy than it; and
  establish a communication connection between the client and another client on behalf of an unreachable node responsive to a request received from the client when the client determines that the node for which it has assumed responsibility is unreachable,
  wherein likelihood of reachability is tuned by a central node responsive to the node receiving a request from the client to establish the communication connection for the unreachable node and established for at least some nodes in the communication system, based on client reports associated with attempting to contact the unreachable node, the client reports being received from respective clients by the central node for tuning, wherein the tuning is based, at least in part, on a suitable route identified by client-side algorithms, the tuning including generating information that includes instructions for updating the unreachable node's standing within the hierarchy, the tuning resulting in the unreachable node being rearranged in a different level of the hierarchy.

* * * * *